(12) United States Patent
Emami et al.

(10) Patent No.: US 9,841,802 B2
(45) Date of Patent: Dec. 12, 2017

(54) WAKE LOCK MANAGEMENT THROUGH APPLICATION MONITORING

(71) Applicant: QUALCOMM Incorporated, San Diego, CA (US)

(72) Inventors: Hussein Emami, San Diego, CA (US); Mustafa Saglam, San Diego, CA (US); Ankur Gupta, San Diego, CA (US); Ajay Tomar, San Diego, CA (US); Andrew Timothy Hunter, San Diego, CA (US); Manish Tripathi, San Diego, CA (US); Alejandro Raul Holcman, San Diego, CA (US); Daniel Holman Agre, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 14/185,852

(22) Filed: Feb. 20, 2014

(65) Prior Publication Data

US 2015/0234442 A1 Aug. 20, 2015

(51) Int. Cl.
*G06F 1/32* (2006.01)
(52) U.S. Cl.
CPC .................. *G06F 1/3206* (2013.01)
(58) Field of Classification Search
None
See application file for complete search history.

(56) References Cited

U.S. PATENT DOCUMENTS

| 5,416,726 | A | * | 5/1995 | Garcia-Duarte | G06F 1/3203 |
| | | | | | 712/E9.032 |
| 8,538,484 | B2 | | 9/2013 | Chan et al. | |
| 8,612,786 | B1 | * | 12/2013 | Lachwani | G06F 1/3228 |
| | | | | | 713/322 |
| 8,850,251 | B1 | * | 9/2014 | Maeng | G06F 1/3206 |
| | | | | | 713/300 |
| 2006/0246924 | A1 | * | 11/2006 | Balasubramanian | H04W 68/00 |
| | | | | | 455/459 |
| 2011/0040989 | A1 | | 2/2011 | Keyes | |
| 2011/0040996 | A1 | | 2/2011 | Hackborn et al. | |

(Continued)

FOREIGN PATENT DOCUMENTS

| CN | 103324519 A | 9/2013 |
| CN | 103402027 A | 11/2013 |

OTHER PUBLICATIONS

ISA/EPO, International Search Report and Written Opinion of the International Searching Authority, Int'l. App. No. PCT/US2015/014965, dated Apr. 17, 2015, European Patent Office, Rijswijk, NL, 9 pgs.

*Primary Examiner* — Paul J Yen
(74) *Attorney, Agent, or Firm* — Holland & Hart LLP

(57) ABSTRACT

Methods, systems, and devices are described for managing wake locks in a wireless communication device. The described methods, systems and devices may enable a wireless communication device to monitor activity of an application for which a wake lock is held. The described approach may manage the wake lock based at least in part on the activity or inactivity of the application. For example, when the application is inactive or has activity below a particular threshold for a certain amount of time, the described approach may determine to release the wake lock.

25 Claims, 10 Drawing Sheets

(56) References Cited

U.S. PATENT DOCUMENTS

2012/0102191 A1* 4/2012 Rabii .................... G06F 9/5011
709/224
2013/0042122 A1 2/2013 Hackborn et al.
2013/0268257 A1 10/2013 Hu et al.
2013/0316769 A1 11/2013 Kim

* cited by examiner

WAKE LOCK MANAGEMENT THROUGH APPLICATION MONITORING

BACKGROUND

The following relates generally to wireless communication, and more specifically to wireless communication devices that employ wake locks for applications running thereon. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. In general, it is desirable to reduce or minimize power consumption by a mobile device because such devices typically have limited power availability provided by rechargeable batteries. As such, it is known to have a mobile device enter a lower power state (e.g., a sleep mode or state) when the device is not active, for example, communicating with a base station.

However, an important part of an operating system application program interface (API) is a wake lock. A wake lock provides a mechanism for the application developer to indicate that their application needs the device to stay on (e.g., remain in a higher power state, for example, by not entering a sleep mode). Wake locks may be configured with a variety of states that affect the device's central processing unit (CPU), screen, and/or keyboard behavior. The wake locks referenced here are user space wake locks, controlled via the operating system API. Kernel space wake locks are classified differently and limit the CPU's ability to idle or suspend.

Wake locks, however, may affect the battery life of a mobile device. For example, once a user grants an application permission to create wake locks for a device, the application may create a wake lock, which may prevent the CPU from entering the suspend (or sleep) state and may even override the user's indication that they would like to suspend the CPU. Improper wake lock management can take two forms: (1) unnecessarily creating a wake lock; and (2) holding a wake lock longer than necessary.

The second form of improper wake lock management extends, in the most extreme case, to an application not releasing a wake lock at all, and therefore holding the wake lock until the operating system of the device stops the application.

SUMMARY

The described features generally relate to one or more improved systems, methods, and/or apparatuses for managing wake locks in a wireless communication device. The described features may enable a wireless communication device to monitor activity of an application for which a wake lock is held. The device may manage the wake lock based at least in part on the activity or inactivity of the application. For example, when the application is inactive or has activity below a particular threshold for a certain amount of time, the device may determine to release the wake lock.

A method for managing wake locks in a wireless communication device is described. In one configuration, the method may involve monitoring activity of an application for which a wake lock is held on the wireless communication device. Whether to release the wake lock may be determined based at least in part on the monitored activity of the application.

In some embodiments, the determining of whether to release the wake lock may involve identifying at least one metric related to the activity of the application. In such embodiments, the identifying of the at least one metric may involve identifying at least one metric for each process associated with the application. Alternatively or additionally, the identifying of the at least one metric may involve identifying at least one metric for each service associated with the application. Further, alternatively or additionally, the identifying of the at least one metric related to the activity of the application may involve using one or a combination of two or more of the following, selected from the group consisting of: processor usage/load; process runtime; service runtime; number of processes; number of services; instances of kernel space wake locks held by services associated with the application; screen status; disk activity; network activity; memory usage/activity; and, sensor usage.

In some embodiments, the identifying of the at least one metric related to the activity of the application may involve identifying a plurality of metrics related to the activity of the application. The identified plurality of metrics may be aggregated to obtain an activity score. In such embodiments, the aggregating of the plurality of metrics to obtain the activity score may involve aggregating the identified plurality of metrics in a weighted linear combination.

In some embodiments, the method may involve identifying a monitoring interval, a number of monitoring intervals with the activity score below a threshold value, the threshold value, or a combination thereof based at least in part on the application. In some embodiments, the method may involve comparing the obtained activity score to a threshold value. In such embodiments, the determining of whether to release the wake lock may be based at least in part on a result of the comparing. In some embodiments, the method also may involve identifying the threshold value based at least in part on the application.

Alternatively or additionally, the method may involve identifying a number of monitoring intervals with the activity score below the threshold value. In such embodiments, the method may involve releasing the wake lock when the activity score is below the threshold value for the identified number of monitoring intervals. In some embodiments, the identifying of the number of monitoring intervals may be based at least in part on the application.

An apparatus for managing wake locks is described. In one configuration, the apparatus may include means for monitoring activity of an application for which a wake lock is held on a wireless communication device. The apparatus also may include means for determining whether to release the wake lock based at least in part on the monitored activity of the application. In various embodiments, the apparatus may include means for performing some or all of the functions and/or operations of the method described above and/or as described herein.

A device for managing wake locks is described. In one configuration, the device may include a processor and memory in electronic communication with the processor.

The memory may embody instructions, which may be executable by the at least one processor to: monitor activity of an application for which a wake lock is held on a wireless communication device; and, determine whether to release the wake lock based at least in part on the monitored activity of the application. In various embodiments, the device may include instructions executable by the processor to perform some or all of the functions and/or operations of the method described above and/or as described herein.

A computer program product is also described. The computer program product may be a non-transitory computer-readable medium storing instructions executable by a processor to: monitor activity of an application for which a wake lock is held on the wireless communication device; and, determine whether to release the wake lock based at least in part on the monitored activity of the application. In various embodiments, the computer program product may include instructions executable by the processor to perform some or all of the functions and/or operations of the method described above and/or as described herein.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
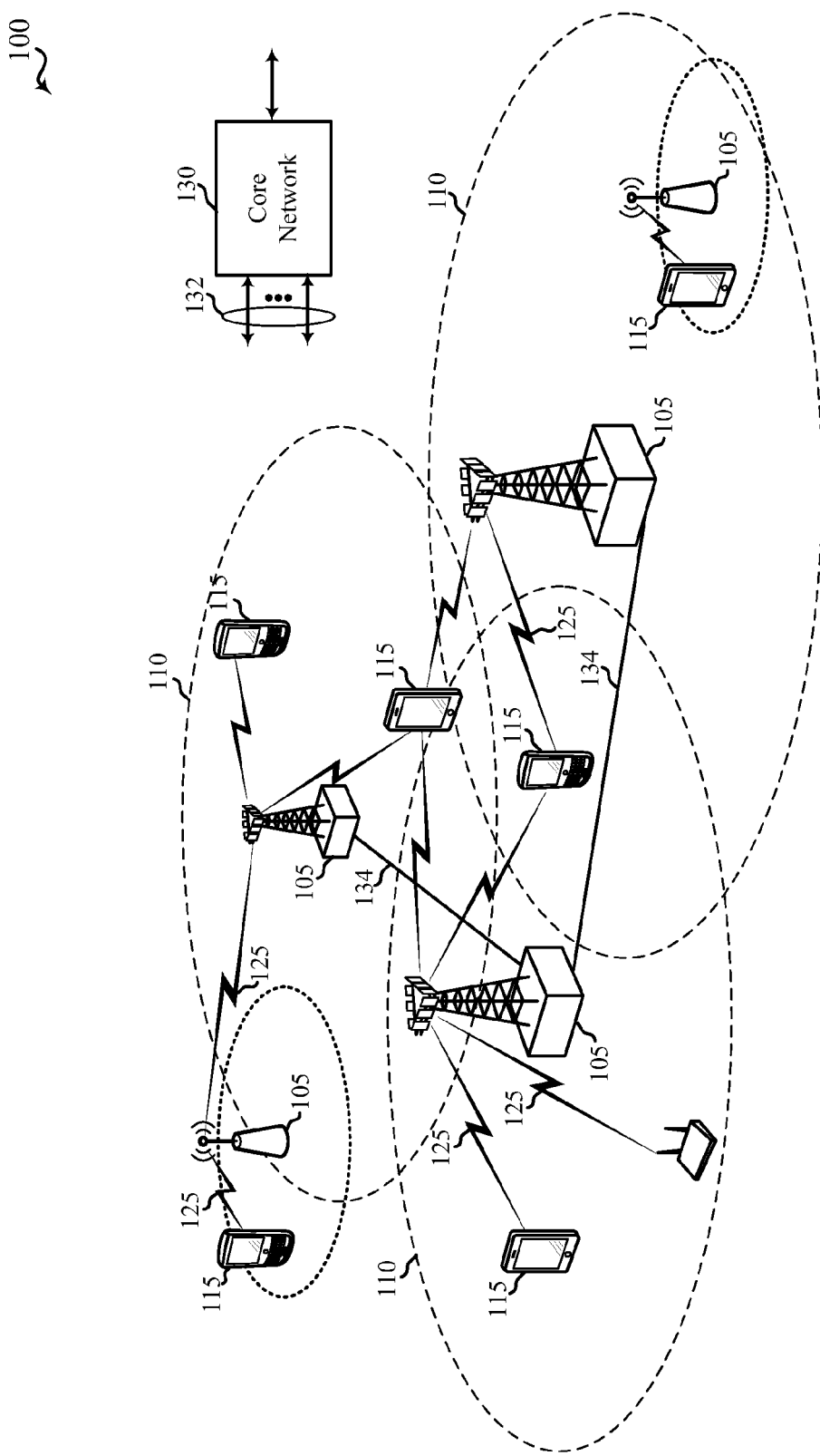
FIG. 1 shows a block diagram of a wireless communications system.

The proposed invention involves implementing a wake lock manager that may manage wake locks, and release wake locks for applications when deemed appropriate. The general approach for identifying wake locks for release involves: for each wake lock, while the wake lock is held, periodically measuring or otherwise determining activity for the application holding the wake lock. Examples of metrics that may be used to measure application activity are: processor (e.g., central processing unit (CPU), graphics processing unit (GPU), digital signal processor (DSP), etc.) usage/load (e.g., clock cycles used); process runtime; service runtime; number of processes; number of services; instances of kernel space wake locks held by services associated with the application; screen status (e.g., application in foreground); disk activity; network activity; sensor usage; memory usage/activity; etc.

Such metrics may be identified, determined and/or measured for each of the processes and/or services associated with an application. The metrics may be aggregated, for example, in a weighted linear combination to arrive at an application activity score. If the application activity score drops below a given threshold, for example, for a set number of measurement cycles, then the wake lock may be released. The values used for the measurement interval, the application activity threshold and/or the number of measurement intervals an application activity score must fall below the threshold before the corresponding wake lock is released may be identified or otherwise determined on a per application basis (e.g., based at least in part on the particular application). A heuristic algorithm may be used to set such values based on the application requesting the wake lock; for example, a music playback application may have different wake lock monitoring parameters as compared to those of a banking application. In this manner, applications that are not expected to need extended wake locks may have relatively more aggressive parameters that will release the wake lock sooner, helping to mitigate both forms of improper wake lock management. Releasing an improperly held wake lock may lead to significant power savings.

Although user space wake locks only currently exist in the Android® operating system, aspects of the present invention would be applicable to any operating system that allows user space applications to control system power states.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments. The following description uses the terms DTX and discontinuous transmission interchangeably.

Turning first to FIG. 1, a block diagram of an example of a wireless communications system 100 is shown, in accordance with various aspects of the present disclosure. The wireless communications system 100 includes a plurality of access points (e.g., base stations, eNBs, or WLAN access points) 105, a number of wireless communication devices or user equipments (UEs) 115, and a core network 130. Some of the access points 105 may communicate with the UEs 115 under the control of a base station controller (not shown), which may be part of the core network 130 or certain access points 105 (e.g., base stations or eNBs) in various embodiments. Some of the access points 105 may communicate control information and/or user data with the core network 130 through backhaul 132. In some embodiments, some of the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some embodiments, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for an access point may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some embodiments, the wireless communications system 100 may include an LTE/LTE-A communications system (or network), which LTE/LTE-A communications system may support one or more LTE-U modes of operation or deployment scenarios. In other embodiments, the wireless communications system 100 may support wireless communication using an unlicensed spectrum and an access technology different from LTE-U, or a licensed spectrum and an access technology different from LTE/LTE-A. In LTE/LTE-A communications systems, the term evolved NodeB or eNB may be generally used to describe the access points 105. The wireless communications system 100 may be a Heterogeneous LTE/LTE-A/LTE-U network in which different types of eNBs provide coverage for various geographical regions. For example, each eNB 105 may provide communication coverage for a macro cell, a pico cell, a femto cell, and/or other types of cells. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1 application protocol, etc.). The eNBs 105 may also communicate with one another, e.g., directly or indirectly via backhaul links 134 (e.g., X2 application protocol, etc.) and/or via backhaul 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless communication device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communications system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions.

One or more of the UEs 115 may be configured to implement wake locks for applications running thereon. Thus, even when such a UE 115 is not actively communicating with one or more of the base stations 105, the UE 115 may be prevented from entering a lower power state (e.g., an idle, suspend or sleep mode or state) by a wake lock held for an application on the UE 115. As such, it may be desirable to manage wake locks for the UE 115, for example, to conserve power.

Figure 2A:
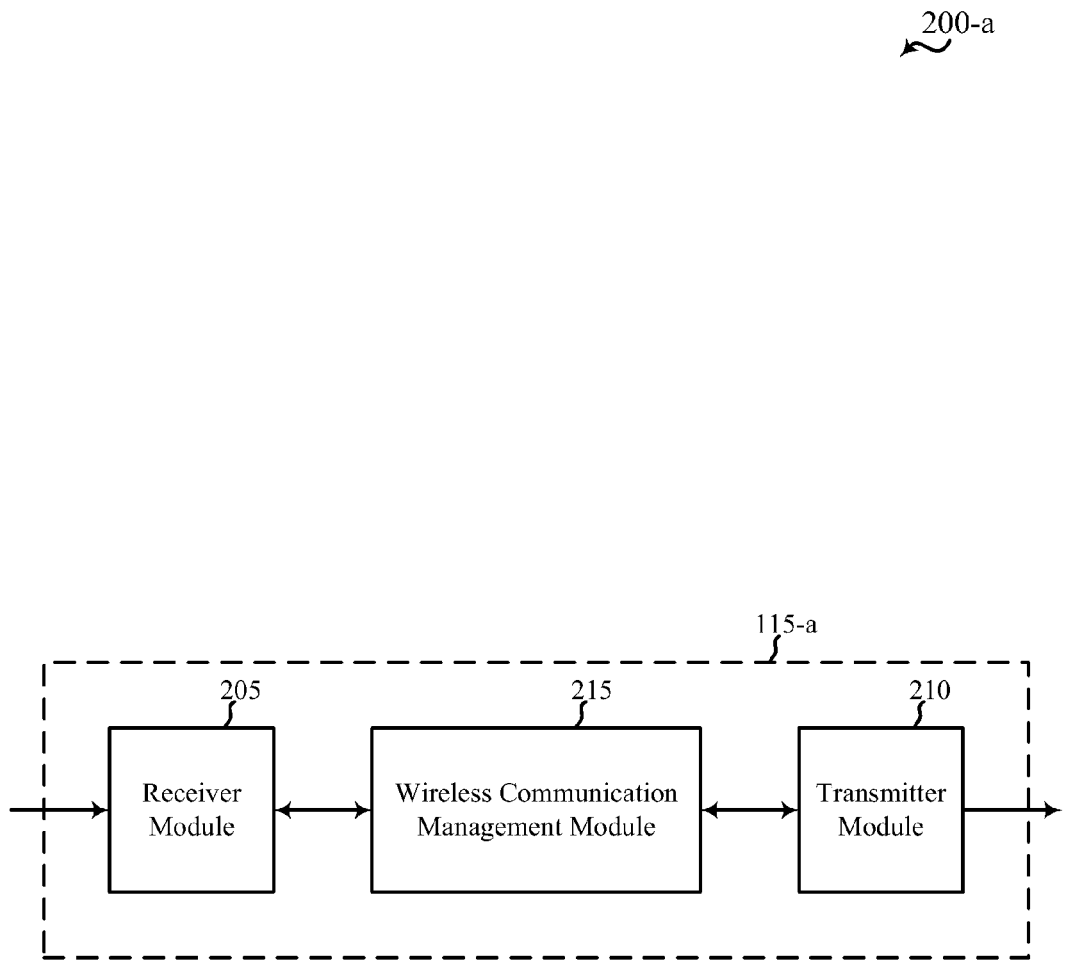
FIG. 2A shows a block diagram of an example of a wireless communication device for managing wake locks.

FIG. 2A shows a block diagram 200-a of a wireless communication device 115-a configured for managing wake locks, in accordance with various aspects of the present disclosure. In some embodiments, the wireless communication device 115-a may be an example of one or more aspects of the wireless communication devices 115 described with reference to FIG. 1. The wireless communication device 115-a may also be a processor. The wireless communication device 115-a may include a receiver module 205, a transmitter module 210 and/or a wireless communication management module 215. Each of these components may be in communication with each other.

The components of the wireless communication device 115-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 205 may be or include a wireless receiver, such as a cellular receiver and/or a wireless local area network (WLAN) receiver. The receiver module 205 may also include more than one wireless receiver. The receiver module 205 may be used to receive various types of data and/or control signals (i.e., transmissions) over one or more communication links (e.g., channels) of one or more wireless communication systems, such as one or more communication links 125 of the wireless communication system 100 described with reference to FIG. 1.

In some embodiments, the transmitter module 210 may be or include a wireless transmitter, such as a cellular transmitter and/or a WLAN transmitter. The transmitter module 210 may also include more than one wireless transmitter. The transmitter module 210 may be used to transmit various types of data and/or control signals (i.e., transmissions) over one or more communication links (e.g., channels) of one or more wireless communication systems, such as one or more communication links 125 of the wireless communication system 100 described with reference to FIG. 1.

In some embodiments, the wireless communication management module 215 may be used to manage wireless communication of the wireless communication device 115-*a*. In some cases, the management of wireless communication may include the management of wake locks for applications on the wireless communication device 115-*a* as described herein.

Figure 2B:
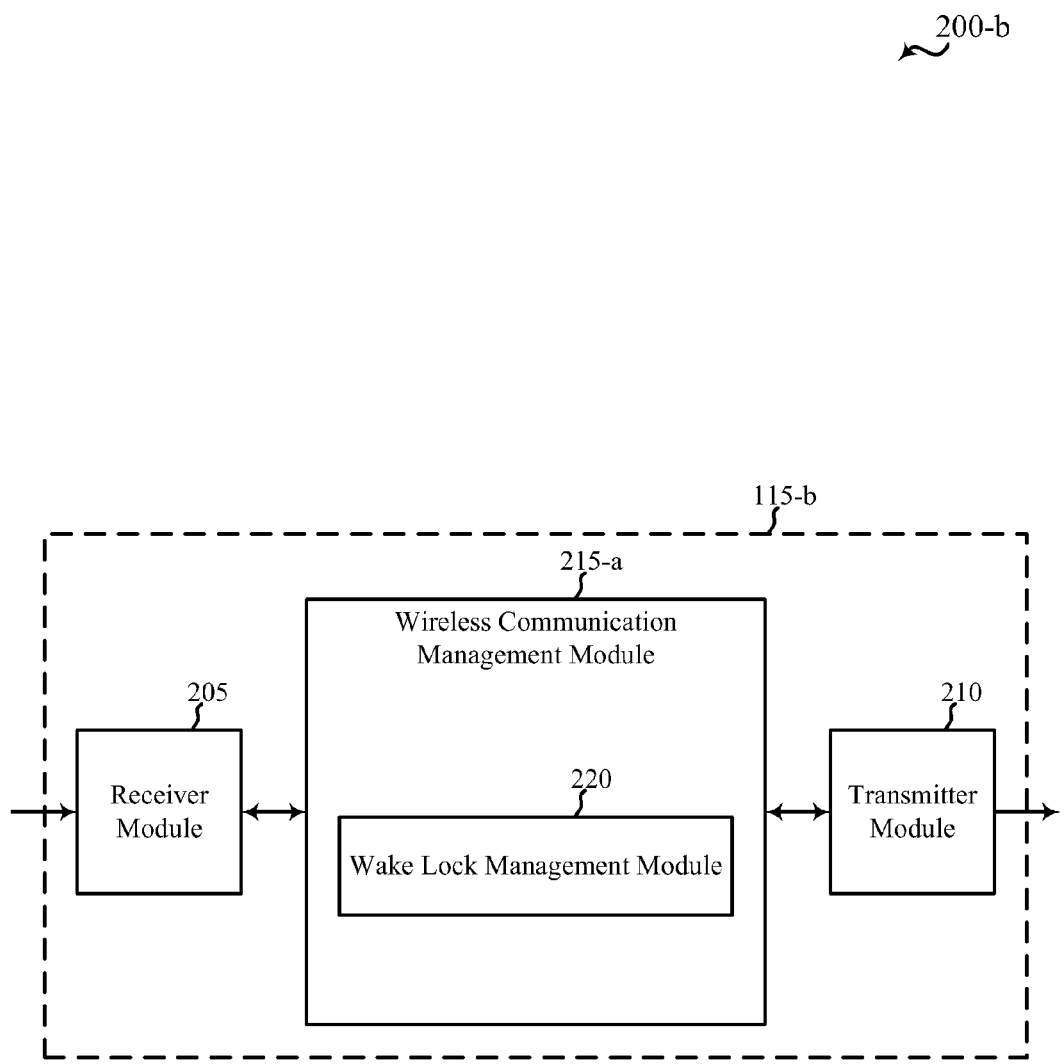
FIG. 2B shows a block diagram of another example of a wireless communication device for managing wake locks.

FIG. 2B shows a block diagram 200-*b* of a wireless communication device 115-*b* configured for managing wake locks, in accordance with various aspects of the present disclosure. In some embodiments, the wireless communication device 115-*b* may be an example of one or more aspects of the wireless communication devices 115 described with reference to FIGS. 1 and/or 2A. The wireless communication device 115-*b* may also be a processor. The wireless communication device 115-*b* may include a receiver module 205, a wireless communication management module 215-*a*, and/or a transmitter module 210. Each of these components may be in communication with each other.

The components of the wireless communication device 115-*b* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 205 and the transmitter module 210 may be configured similarly to the receiver module 205 and the transmitter module 210 described with reference to FIG. 2A.

In some embodiments, the wireless communication management module 215-*a* may be an example of the wireless communication management module 215 described with reference to FIG. 2A and may include a wake lock management module 220. Each of these components may be in communication with each other.

The wake lock management module 220 may be used to perform various operations for wake lock management as described herein. The wake lock management module 220 may perform such operations in cooperation or conjunction with other components of the wireless communication management module 215, as appropriate or desired. In some embodiments, the wake lock management module 220 may be configured to monitor activity of an application (or plural applications) and to determine whether to release a wake lock held for the application (or a respective wake lock for each application) using the monitored activity.

For example, when a wake lock is held on the device for an application, the wake lock management module 220 may monitor the activity of the application. The wake lock management module 220 may determine whether the activity of the application falls below a particular threshold for a certain amount of time, such as for one or more monitoring intervals. If the activity of the application falls below the particular threshold for the certain amount of time (e.g., for a desired number of monitoring intervals), then the wake lock management module 220 may determine that the wake lock associated with the application should be released. The wake lock management module 220 may then release the wake lock itself, or instruct/request that the wake lock be released.

Figure 2C:
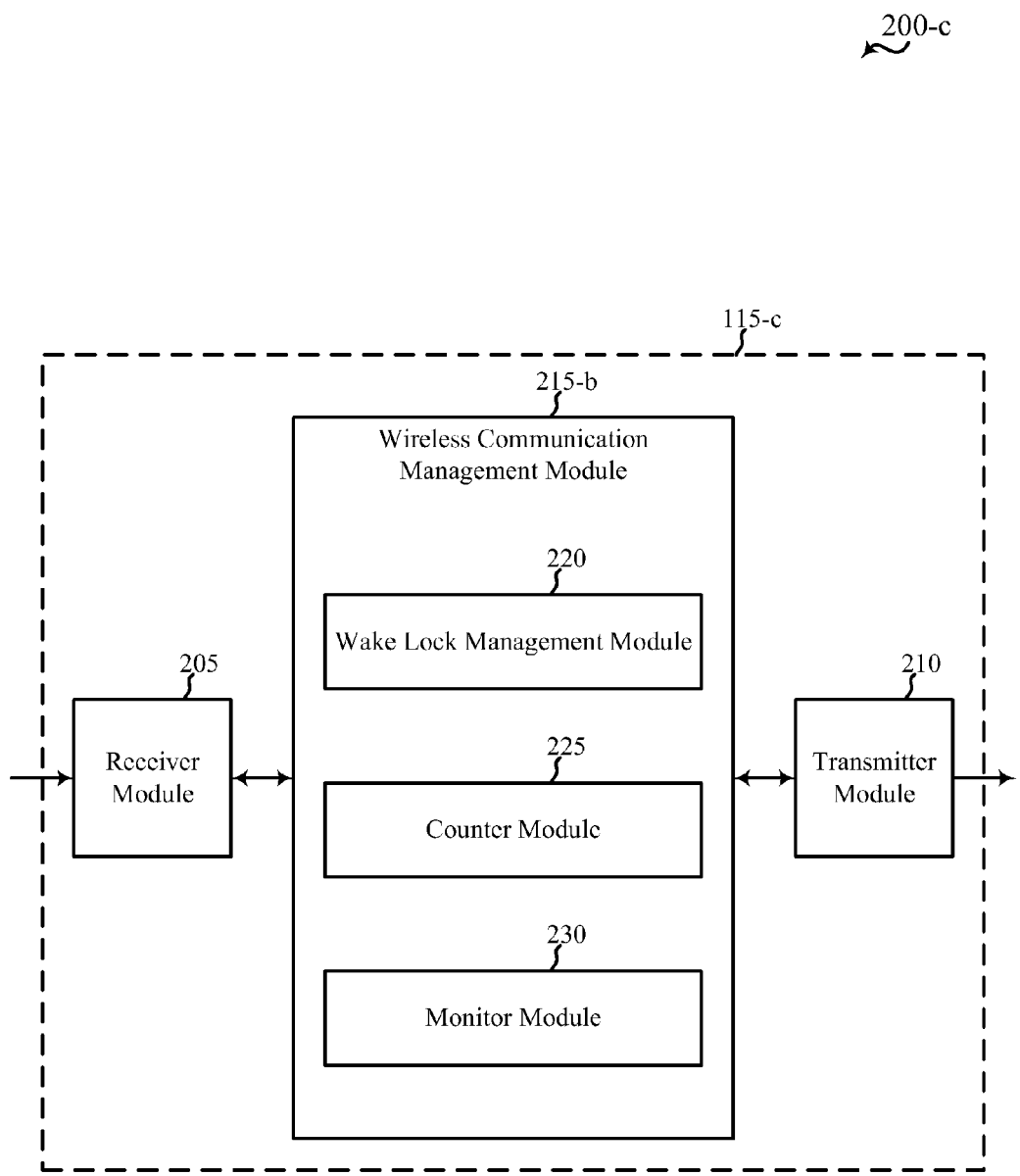
FIG. 2C shows a block diagram of another example of a wireless communication device for managing wake locks.

FIG. 2C shows a block diagram 200-*c* of a wireless communication device 115-*c* configured for managing wake locks, in accordance with various aspects of the present disclosure. In some embodiments, the wireless communication device 115-*c* may be an example of one or more aspects of the wireless communication devices 115 described with reference to FIGS. 1, 2A, and/or 2B. The wireless communication device 115-*c* may also be a processor. The wireless communication device 115-*c* may include a receiver module 205, a wireless communication management module 215-*b*, and/or a transmitter module 210. Each of these components may be in communication with each other.

The components of the wireless communication device 115-*c* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 205 and the transmitter module 210 may be configured similarly to the receiver module 205 and the transmitter module 210 described with reference to FIG. 2A.

In some embodiments, the wireless communication management module 215-*b* may be an example of the wireless communication management module 215 described with reference to FIGS. 2A and/or 2B and may include a wake lock management module 220, a counter module 225, and/or a monitor module 230. Each of these components may be in communication with each other.

The wake lock management module 220 may be an example of wake lock management module 220 described with reference to FIG. 2B and may be used to manage one or more wake locks for applications on the device 115-*c*. Thus, the wake lock management module 220 may be used to perform various operations for wake lock management as described herein. The wake lock management module 220 may perform such operations in cooperation or conjunction with other components of the wireless communication management module 215-*b*, as appropriate or desired. In some embodiments, the wireless communication management module 215-*b* may include a counter module 225 and/or a monitor module 230.

The monitor module 230 may be configured to monitor activity of an application (or plural applications) for which a wake lock (or wake locks) is held. The monitor module 230 may provide information regarding the activity of the application to the wake lock management module 220 so that the wake lock management module 220 may determine whether to release a wake lock held for the application using the monitored activity.

The counter module 225 may be configured to keep track of a number of monitoring intervals for which the activity of the application falls below a particular threshold. For example, the wake lock management module 220 may determine that the activity of the application falls below the threshold for a particular monitoring interval, and the counter may be incremented. If the value of the counter after being incremented is equal to a desired number of monitoring intervals, the wake lock management module 220 may determine that the wake lock for the application should be released. As such, when the desired number of monitoring intervals is greater than one, the desired number may indicate a number of consecutive monitoring intervals for which the activity of the application falls below the threshold for the wake lock management module 220 to determine that the wake lock for the application should be released.

Figure 2D:
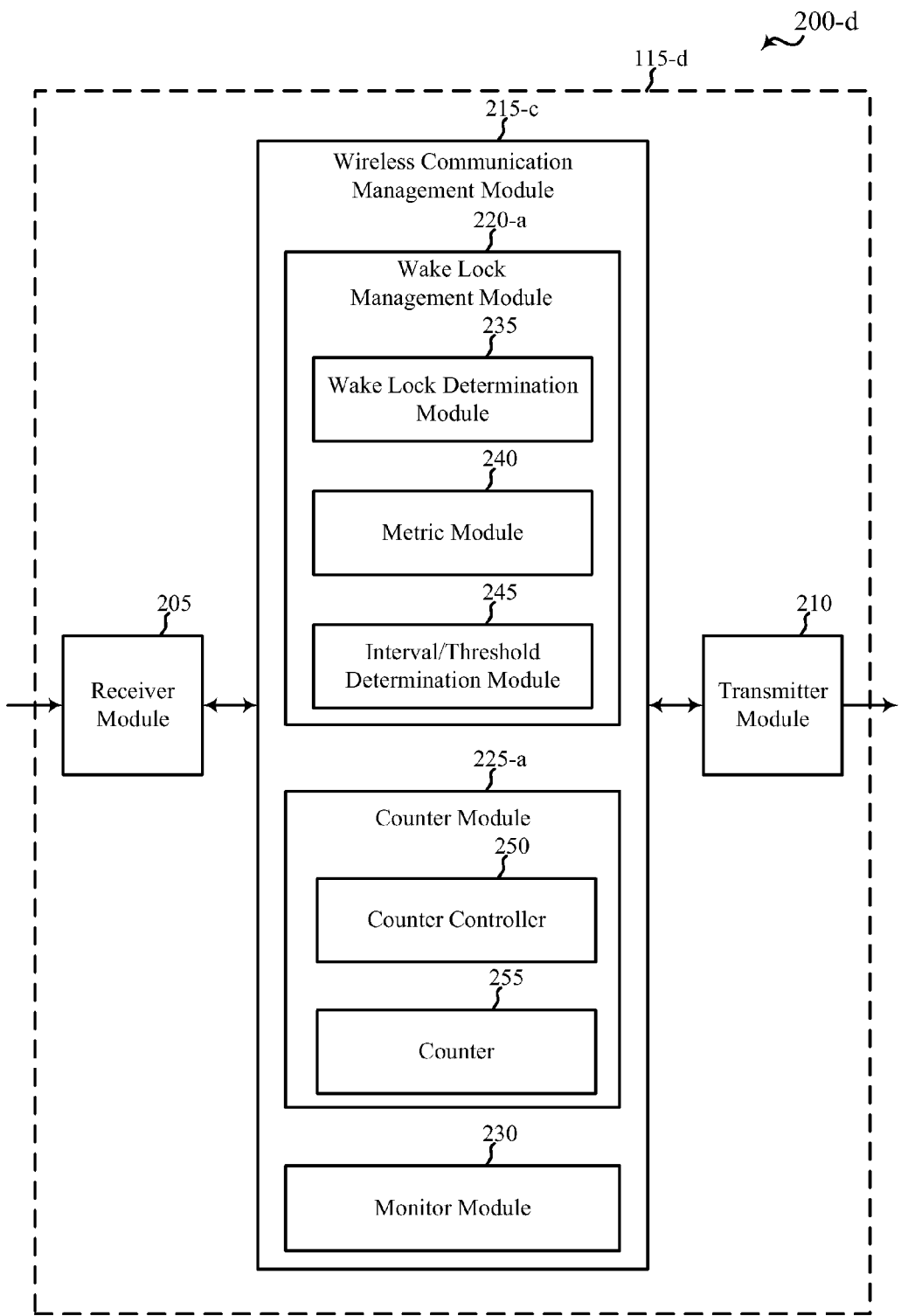
FIG. 2D shows a block diagram of another example of a wireless communication device for managing wake locks.

FIG. 2D shows a block diagram 200-*d* of a wireless communication device 115-*d* configured for managing wake locks, in accordance with various aspects of the present disclosure. In some embodiments, the wireless communication device 115-*d* may be an example of one or more aspects of the wireless communication devices 115 described with reference to FIGS. 1, 2A, 2B, and/or 2C. The wireless communication device 115-*d* may also be a processor. The wireless communication device 115-*d* may include a receiver module 205, a wireless communication management module 215-*c*, and/or a transmitter module 210. Each of these components may be in communication with each other.

The components of the wireless communication device 115-*d* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 205 and the transmitter module 210 may be configured similarly to the receiver module 205 and the transmitter module 210 described with reference to FIG. 2A.

In some embodiments, the wireless communication management module 215-*c* may be an example of the wireless communication management module 215 described with reference to FIGS. 2A and/or 2B and may include a wake lock management module 220-*a*, a counter module 225-*a*, and/or a monitor module 230. Each of these components may be in communication with each other.

The wake lock management module 220-*a* may be an example of the wake lock management module 220 described with reference to FIGS. 2B and/or 2C and may be used to manage one or more wake locks for applications on the device 115-*d*. Thus, the wake lock management module 220-*a* may be used to perform various operations for wake lock management as described herein. The wake lock management module 220-*a* may perform such operations in cooperation or conjunction with other components of the wireless communication management module 215-*c*, as appropriate or desired.

In some embodiments, the wake lock management module 220-*a* may include a wake lock determination module 235, a metric module 240 and/or an interval/threshold determination module 245. The wake lock determination module 235 may be configured to determine whether to release a wake lock held for an application on the device 115-*d*. The metric module 240 may be configured to identify one or more metrics related to activity of the application. For example, the metric module 240 may be configured to identify metric(s) corresponding to one or more of: processor usage/load; process runtime; service runtime; number of processes; number of services; instances of kernel wake locks held by services associated with the application; screen status; disk activity; network activity; memory usage/activity; and, sensor usage. In some embodiments, the metric module 240 (or the wake lock management module 220-*a*, or the wireless communication management module 215-*c*) may be configured to identify the metrics based at least in part on the application (e.g., its properties, its operations/functions, its type or class, etc.). The metric module 240 may be configured to identify at least one metric for each process and/or each service associated with the application.

The interval/threshold determination module 245 may be configured to identify or otherwise determine the threshold value for the monitored activity of the application. In some embodiments, the threshold value may be determined based at least in part on the application (e.g., its properties, its operations/functions, its type or class, etc.). Alternatively or additionally, the interval/threshold determination module 245 may be configured to identify or otherwise determine a monitoring interval for the application. In some embodiments, the monitoring interval also may be determined based at least in part on the application. The interval/threshold determination module 245 also may be configured to identify or otherwise determine a number of monitoring intervals for which the activity of the application falling below a particular threshold indicates that the wake lock should be released. The number of monitoring intervals also may be determined based at least in part on the application, and may be a consecutive number of monitoring intervals as discussed above.

The counter module 225-a may be an example of the counter module 225 described with reference to FIG. 2C and may be used to keep track of a number of monitoring intervals for which the activity of the application falls below a particular threshold. The counter module 225-a may include a counter controller 250 and/or a counter 255.

The monitor module 230 may be an example of the monitor module 230 described with reference to FIG. 2C and may be configured to monitor activity of an application (or plural applications) for which a wake lock (or wake locks) is held. The monitor module 230 may provide information regarding the activity of the application to the metric module 240. The metric module 240 may generate one or more metrics using the provided information regarding the activity of the application. In some embodiments, the metric module 240 may be configured to generate a plurality of metrics. In such case, the metric module 240 may be configured to aggregate the plurality of metrics to obtain an activity score of the application for the current monitoring interval. For example, the plurality of metrics may be aggregated in a weighted linear combination. The metric module 240 may generate an activity score for each monitoring interval. The wake lock determination module 235 (or the wake lock management module 220-a) may compare the activity score to the threshold, and if the activity score is less than the threshold for the determined number of monitoring intervals, then the wake lock determination module 235 may determine that the wake lock for the application should be released.

In order to determine whether the activity score is less than the threshold for the determined number of monitoring intervals, the wake lock determination module 235 may instruct the counter controller 250 to increment the counter 255 each time the activity score is less than the threshold for the current monitoring interval. If the activity score is not less than the threshold for the current monitoring interval, the wake lock determination module 235 may instruct the counter controller 250 to reset the counter 255. The value of the counter 255 may be provided to or obtained by the wake lock determination module 235, which may compare the counter value to the determined number of monitoring intervals. If the counter value is equal to the determined number of monitoring intervals, the wake lock determination module 235 may determine that the wake lock for the application should be released.

Alternatively, it is possible for the metric module 240 to generate a plurality of metrics without aggregating the metrics. In such case, each metric may have a corresponding threshold value to be compared to. The wake lock determination module 235 may make the appropriate comparisons and may determine whether the wake lock should be released using results of the comparisons. For example, the wake lock determination module 235 may determine that the wake lock should be released if all, a certain number, or a certain percentage of the metrics are less than the corresponding thresholds for a current monitoring interval, a determined number of monitoring intervals, or a determined number of consecutive monitoring intervals.

Figure 3:
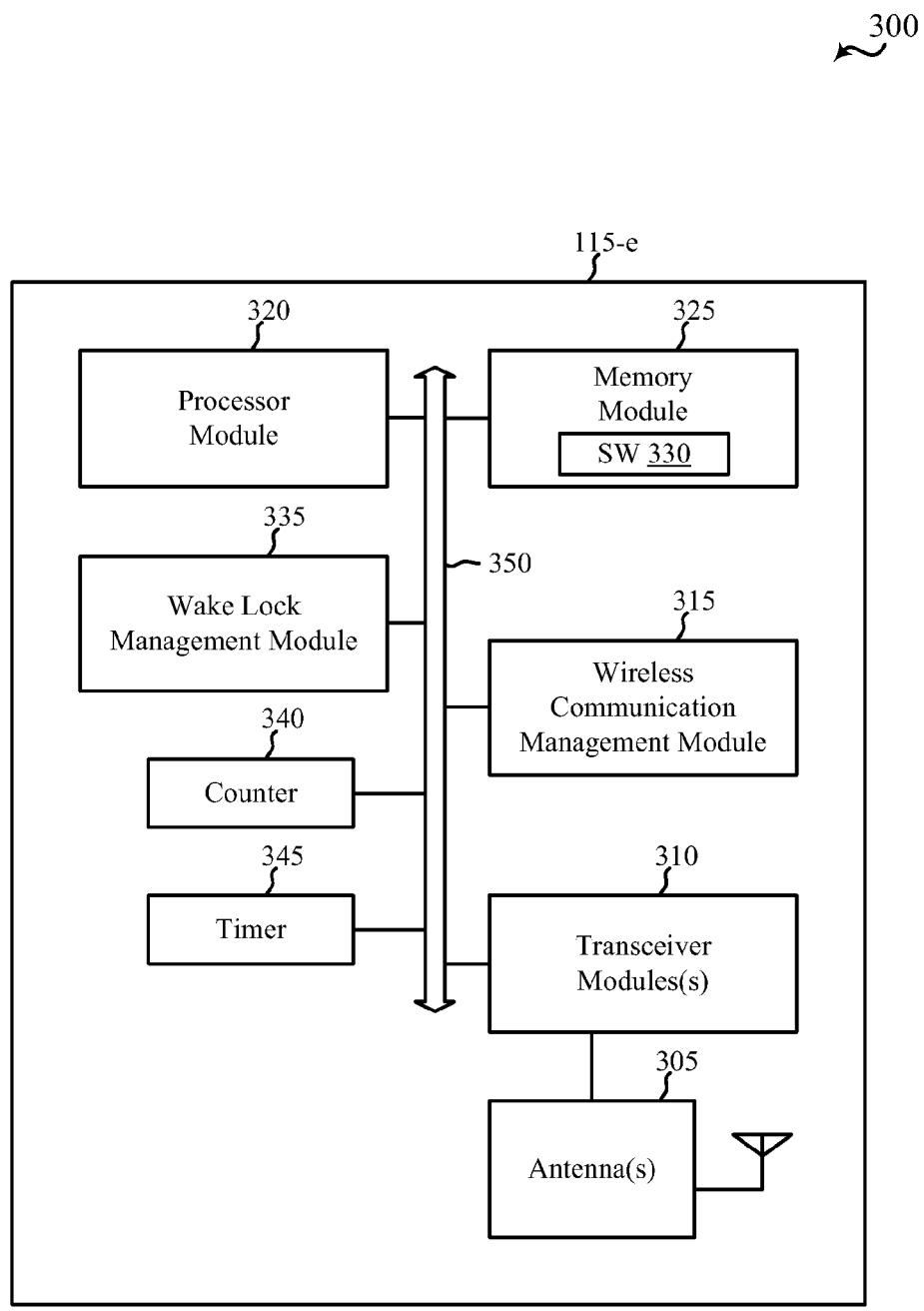
FIG. 3 shows a block diagram of another example of a wireless communication device for managing wake locks.

FIG. 3 shows a block diagram 300 of a wireless communication device 115-e configured for managing wake locks, in accordance with various aspects of the present disclosure. The wireless communication device 115-e may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The wireless communication device 115-e may in some cases have an internal power supply (not shown), such as a small battery, to facilitate mobile operation. In some embodiments, the wireless communication device 115-e may be an example of one or more aspects of one of the wireless communication devices 115 described with reference to FIGS. 1, 2A, 2B, 2C, and/or 2D. The wireless communication device 115-e may be configured to implement at least some of the features and functions described with reference to FIGS. 1, 2A, 2B, 2C, and/or 2D. The wireless communication device 115-e may be configured to communicate with one or more of the base stations/access points 105 described with reference to FIG. 1.

The wireless communication device 115-e may include at least one antenna (represented by antenna(s) 305), at least one transceiver module (represented by transceiver module(s) 310), a wireless communication management module 315, a processor module 320 and/or a memory module 325. The wireless communication device 115-e also may include a wake lock management module 335, a counter 340 and/or a timer 345. Each of these components may be in communication with each other, directly or indirectly, over one or more buses 350.

The memory module 325 may include random access memory (RAM) and/or read-only memory (ROM). The memory module 325 may store computer-readable, computer-executable software (SW) code 330 containing instructions that are configured to, when executed, cause the processor module 320 to perform various functions described herein for managing wake locks. Alternatively, the software code 330 may not be directly executable by the processor module 320 but be configured to cause the wireless communication device 115-e (e.g., when compiled and executed) to perform various functions described herein.

The processor module 320 may include an intelligent hardware device, e.g., a CPU, a microcontroller, an ASIC, etc. The processor module 320 may process information received through the transceiver module(s) 310 and/or information to be sent to the transceiver module(s) 310 for transmission via the antenna(s) 305. The processor module 320 may handle, alone or in connection with the wireless communication management module 315, the wake lock management module 335, the counter 340 and/or the timer 345, various aspects of managing wake locks as described herein.

The transceiver module(s) 310 may include a modem configured to modulate packets and provide the modulated packets to the antenna(s) 305 for transmission, and to demodulate packets received from the antenna(s) 305. The transceiver module(s) 310 may in some cases be implemented as one or more transmitter modules and one or more separate receiver modules. The transceiver module(s) 310 may be configured to communicate bi-directionally, via the antenna(s) 305, with one or more access points 105 or other devices. While the wireless communication device 115-e may include a single antenna 305, there may be embodiments in which the wireless communication device 115-e may include multiple antennas 305.

The wireless communication management module 315 and/or the wake lock management module 335 may be configured to perform and/or control some or all of the modules described with reference to FIGS. 2B, 2C, and/or 2D and related to wake lock management for the wireless communication device 115-e. The wireless communication management module 315 and/or the wake lock management module 335, or portions thereof, may include a processor, and/or some or all of the functionality of the wireless communication management module 315 and/or the wake lock management module 335 may be performed by the processor module 320 and/or in connection with the processor module 320. The counter 340 may be dedicated to wake lock management operations, or may be one of several counters of the wireless communication device 115-e that may be available for multiple uses. The timer 345 may be used to carry out the desired monitoring intervals. In some embodiments, the timer 345 may be implemented by an internal clock of the wireless communication device 115-e.

Figure 4:
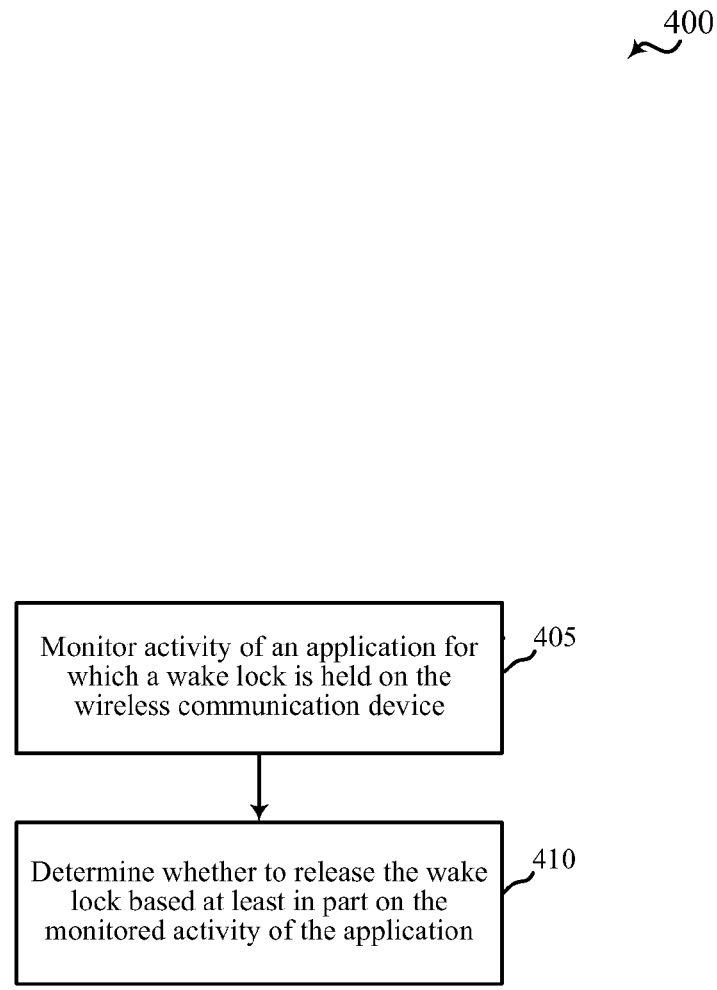
FIG. 4 is a flowchart of an example of a method for managing wake locks in a wireless communication device.

FIG. 4 is a flow chart illustrating an example of a method 400 for managing wake locks, in accordance with various aspects of the present disclosure. For clarity, the method 400 is described below with reference to aspects of one or more of the wireless communication devices 115 described with reference to FIGS. 1, 2A, 2B, 2C, 2D, and/or 3. In some embodiments, a wireless device such as one of the wireless communication devices 115 may execute one or more sets of codes to control the functional elements of the wireless communication device 115 to perform the functions described below.

At block 405, activity of an application for which a wake lock is held on the wireless communication device 115 may be monitored. Such monitoring may begin, for example, when the wake lock for the application is instituted. The operation(s) at block 405 may be performed by the wireless communication management module 215/315, the wake lock management module 220/335, and/or the monitor module 230 described with reference to FIGS. 2A, 2B, 2C, 2D, and/or 3.

At block 410, whether to release the wake lock may be determined using the monitored activity of the application. For example, if the monitored activity of the application is less than a threshold, the wireless communication device 115 may determine that the wake lock associated with the application should be released. The operation(s) at block 410 may be performed by the wireless communication management module 215/315, the wake lock management module 220/335, and/or the wake lock determination module 235 described with reference to FIGS. 2A, 2B, 2C, 2D, and/or 3.

Thus, the method 400 may provide for managing wake locks in a wireless communication device. It should be noted that the method 400 is just one implementation and that the operations of the method 400 may be rearranged or otherwise modified such that other implementations are possible.

Figure 5:
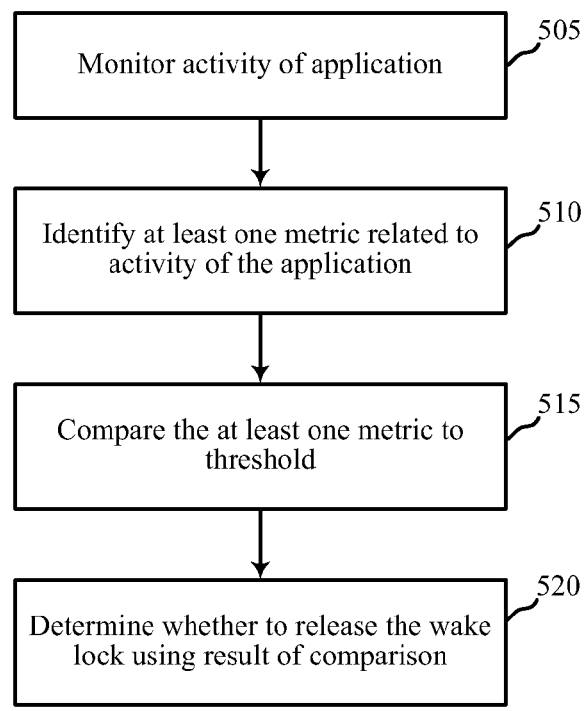
FIG. 5 is a flowchart of another example of a method for managing wake locks in a wireless communication device.

FIG. 5 is a flow chart illustrating an example of a method 500 for managing wake locks, in accordance with various aspects of the present disclosure. For clarity, the method 500 is described below with reference to aspects of one or more of the wireless communication devices 115 described with reference to FIGS. 1, 2A, 2B, 2C, 2D, and/or 3. In some embodiments, a wireless device such as one of the wireless communication devices 115 may execute one or more sets of codes to control the functional elements of the wireless communication device 115 to perform the functions described below.

At block 505, activity of an application for which a wake lock is held may be monitored. As above, the operation(s) at block 505 may be performed by the wireless communication management module 215/315, the wake lock management module 220/335, and/or the monitor module 230 described with reference to FIGS. 2A, 2B, 2C, 2D, and/or 3.

At block 510, at least one metric related to activity of the application may be identified. As discussed above, the metric(s) may be correspond to one or more of: processor usage/load; process runtime; service runtime; number of processes; number of services; instances of kernel space wake locks held for services associated with the application; screen status; disk activity; network activity; memory usage/activity; and, sensor usage. One or more metrics may be identified for each process and/or service associated with the application. The operation(s) at block 510 may be performed by the wireless communication management module 215/315, the wake lock management module 220/335, and/or the metric module 240 described with reference to FIGS. 2A, 2B, 2C, 2D, and/or 3.

At block 515, the at least one metric related to activity of the application may be compared to a threshold. As discussed above, the threshold may be based at least in part on the application. In some embodiments, multiple thresholds may be identified or otherwise determined corresponding to multiple metrics. In such embodiments, the value of each metric may be compared to the corresponding threshold. The operation(s) at block 515 may be performed by the wireless communication management module 215/315, the wake lock management module 220/335, and/or the wake lock determination module 235 described with reference to FIGS. 2A, 2B, 2C, 2D, and/or 3.

At block 520, whether to release the wake lock may be determined using the result(s) of the comparison(s). The case of a single metric is straight forward—if the single metric is less than the threshold, the wireless communication device 115 may determine that the wake lock associated with the application should be released. For the case of multiple metrics, the wireless communication device 115 may determine that the wake lock associated with the application should be released if one of the metrics, some of the metrics or all of the metrics is/are less than the threshold, as appropriate or desired. The operation(s) at block 520 may be performed by the wireless communication management module 215/315, the wake lock management module 220/335, and/or the wake lock determination module 235 described with reference to FIGS. 2A, 2B, 2C, 2D, and/or 3.

Thus, the method 500 may provide for managing wake locks in a wireless communication device. It should be noted that the method 500 is just one implementation and that the operations of the method 500 may be rearranged or otherwise modified such that other implementations are possible.

Figure 6:
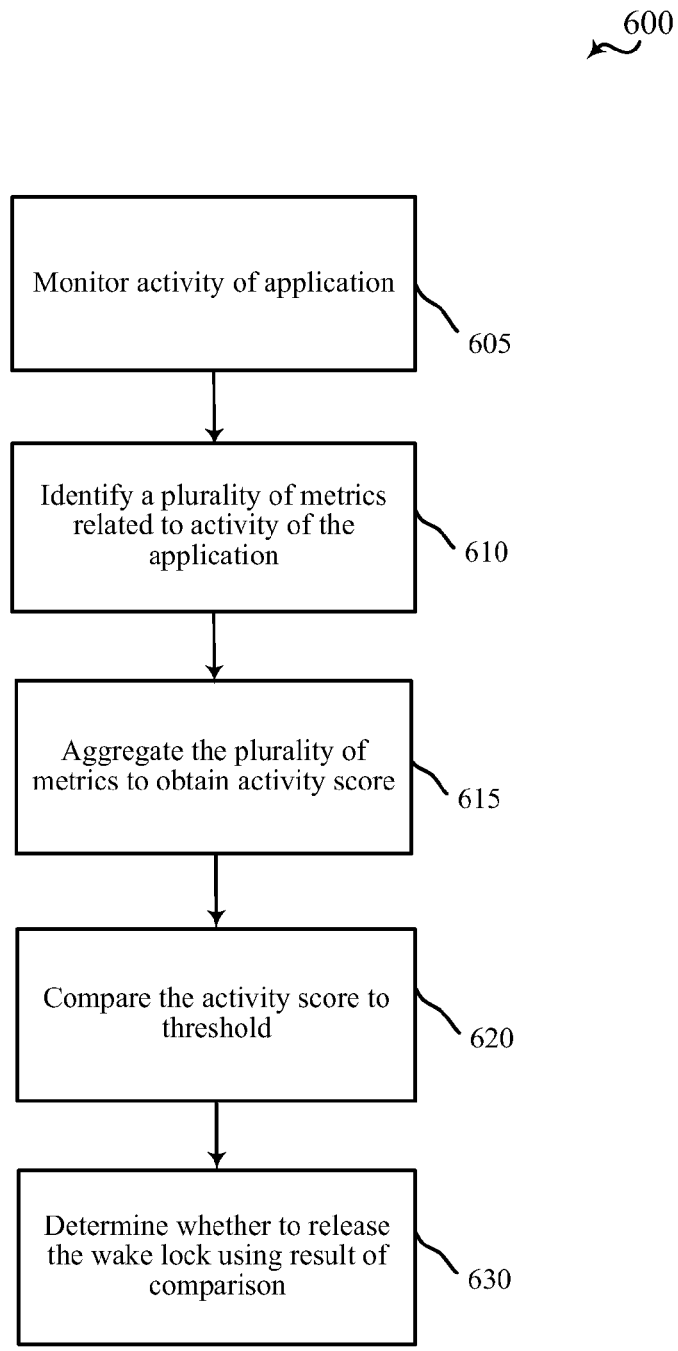
FIG. 6 is a flowchart of another example of a method for managing wake locks in a wireless communication device.

FIG. 6 is a flow chart illustrating an example of a method 600 for managing wake locks, in accordance with various aspects of the present disclosure. For clarity, the method 600 is described below with reference to aspects of one or more of the wireless communication devices 115 described with reference to FIGS. 1, 2A, 2B, 2C, 2D, and/or 3. In some embodiments, a wireless device such as one of the wireless communication devices 115 may execute one or more sets of codes to control the functional elements of the wireless communication device 115 to perform the functions described below.

At block 605, activity of an application for which a wake lock is held may be monitored. As above, the operation(s) at block 605 may be performed by the wireless communication management module 215/315, the wake lock management module 220/335, and/or the monitor module 230 described with reference to FIGS. 2A, 2B, 2C, 2D, and/or 3.

At block 610, a plurality of metrics related to activity of the application may be identified. As discussed above, the metric(s) may be correspond to one or more of: processor usage/load; process runtime; service runtime; number of processes; number of services; instances of kernel space wake locks held for services associated with the application; screen status; disk activity; network activity; memory usage/activity; and, sensor usage. One or more metrics may be identified for each process and/or service associated with the application. The operation(s) at block 610 may be performed by the wireless communication management module 215/ 315, the wake lock management module 220/335, and/or the metric module 240 described with reference to FIGS. 2A, 2B, 2C, 2D, and/or 3.

At block 615, the metrics related to activity of the application may be aggregated to generate or otherwise obtain an activity score. As discussed above, the aggregation may be a weighted linear combination of the plurality of metrics. The operation(s) at block 615 may be performed by the wireless communication management module 215/315, the wake lock management module 220/335, the wake lock determination module 235, and/or the metric module 240 described with reference to FIGS. 2A, 2B, 2C, 2D, and/or 3.

At block 620, the activity score of the application may be compared to a threshold. As discussed above, the threshold may be based at least in part on the application. The operation(s) at block 620 may be performed by the wireless communication management module 215/315, the wake lock management module 220/335, the wake lock determination module 235, and/or the metric module 240 described with reference to FIGS. 2A, 2B, 2C, 2D, and/or 3.

At block 625, whether to release the wake lock may be determined using the result of the comparison. If the activity score is less than the threshold, the wireless communication device 115 may determine that the wake lock associated with the application should be released. The operation(s) at block 625 may be performed by the wireless communication management module 215/315, the wake lock management module 220/335, and/or the wake lock determination module 235 described with reference to FIGS. 2A, 2B, 2C, 2D, and/or 3.

Thus, the method 600 may provide for managing wake locks in a wireless communication device. It should be noted that the method 600 is just one implementation and that the operations of the method 600 may be rearranged or otherwise modified such that other implementations are possible.

Figure 7:
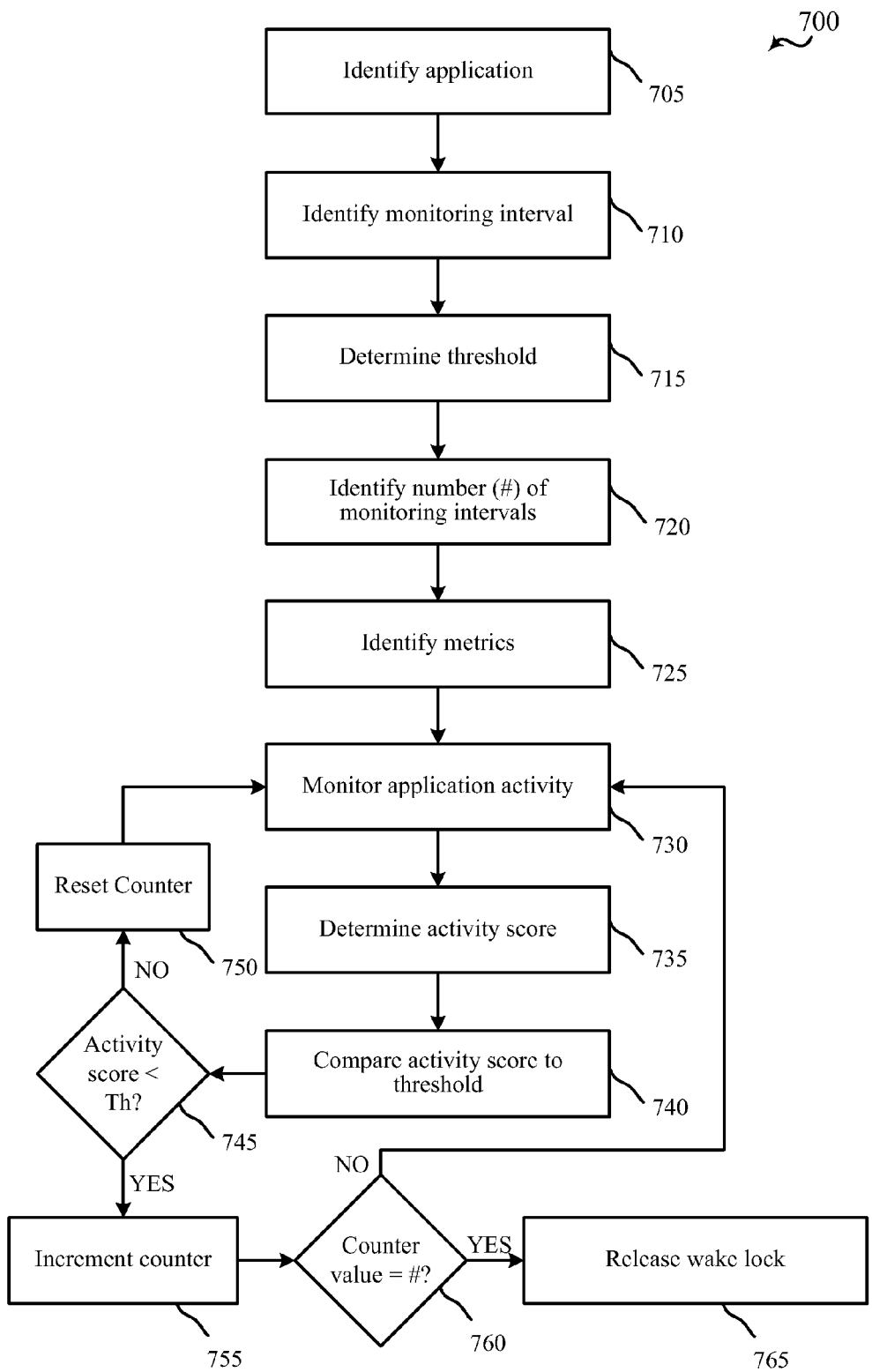
FIG. 7 is a flowchart of another example of a method for managing wake locks in a wireless communication device.

FIG. 7 is a flow chart illustrating an example of a method 700 for managing wake locks, in accordance with various aspects of the present disclosure. For clarity, the method 700 is described below with reference to aspects of one or more of the wireless communication devices 115 described with reference to FIGS. 1, 2A, 2B, 2C, 2D, and/or 3. In some embodiments, a wireless device such as one of the wireless communication devices 115 may execute one or more sets of codes to control the functional elements of the wireless communication device 115 to perform the functions described below.

At block 705, an application for which a wake lock is held may be identified or otherwise determined. This may be performed when the wake lock is instituted, or when the application requests a wake lock, as appropriate or desired. The operation(s) at block 705 may be performed by the wireless communication management module 215/315, the wake lock management module 220/335, and/or the interval/ threshold determination module 245 described with reference to FIGS. 2A, 2B, 2C, 2D, and/or 3.

At block 710, a monitoring interval may be identified or otherwise determined. As discussed above, the monitoring interval may be based at least in part on the application. This also may be performed when the wake lock is instituted, or when the application requests a wake lock, as appropriate or desired. The operation(s) at block 710 may be performed by the wireless communication management module 215/315, the wake lock management module 220/335, and/or the interval/threshold determination module 245 described with reference to FIGS. 2A, 2B, 2C, 2D, and/or 3. Alternatively, the operation(s) at block 710 may be omitted, for example, if the monitoring interval is predetermined or preset.

At block 715, a threshold may be identified or otherwise determined. As discussed above, the threshold also may be based at least in part on the application. This also may be performed when the wake lock is instituted, or when the application requests a wake lock, as appropriate or desired. The operation(s) at block 715 may be performed by the wireless communication management module 215/315, the wake lock management module 220/335, and/or the interval/ threshold determination module 245 described with reference to FIGS. 2A, 2B, 2C, 2D, and/or 3. Alternatively, the operation(s) at block 715 may be omitted, for example, if the threshold is predetermined or preset.

At block 720, a number of monitoring intervals, for which the activity of the application (or a corresponding representation) falling below the threshold may indicate that the wake lock should be released, may be identified or otherwise determined. As discussed above, the number of monitoring intervals may be based at least in part on the application. This also may be performed when the wake lock is instituted, or when the application requests a wake lock, as appropriate or desired. The operation(s) at block 720 may be performed by the wireless communication management module 215/315, the wake lock management module 220/ 335, and/or the interval/threshold determination module 245 described with reference to FIGS. 2A, 2B, 2C, 2D, and/or 3. Alternatively, the operation(s) at block 720 may be omitted, for example, if the number of monitoring intervals is predetermined or preset.

At block 725, a plurality of metrics related to activity of the application may be identified. As discussed above, the metric(s) may be correspond to one or more of: processor usage/load; process runtime; service runtime; number of processes; number of services; instances of kernel space wake locks held for services associated with the application; screen status; disk activity; network activity; memory usage/ activity; and, sensor usage. One or more metrics may be identified for each process and/or service associated with the application. This also may be performed when the wake lock is instituted, or when the application requests a wake lock, as appropriate or desired. The operation(s) at block 725 may be performed by the wireless communication management module 215/315, the wake lock management module 220/ 335, and/or the metric module 240 described with reference to FIGS. 2A, 2B, 2C, 2D, and/or 3. Alternatively, the operation(s) at block 725 may be omitted, for example, if the metric(s) to be used for managing wake locks is/are predetermined or preset.

At block 730, activity of the application for which a wake lock is held may be monitored. The operation(s) at block 730 may be performed by the wireless communication management module 215/315, the wake lock management module 220/335, and/or the monitor module 230 described with reference to FIGS. 2A, 2B, 2C, 2D, and/or 3.

At block 735, an activity score may be generated, determined or otherwise obtained using the monitored metrics. In some embodiments, the activity score may be obtained by aggregating the monitored metrics. As discussed above, the aggregation may be a weighted linear combination of the monitored metrics. The operation(s) at block 735 may be performed by the wireless communication management module 215/315, the wake lock management module 220/ 335, the wake lock determination module 235, and/or the metric module 240 described with reference to FIGS. 2A, 2B, 2C, 2D, and/or 3.

At block 740, the activity score of the application may be compared to the determined threshold. The operation(s) at block 740 may be performed by the wireless communication management module 215/315, the wake lock management module 220/335, the wake lock determination module 235, and/or the metric module 240 described with reference to FIGS. 2A, 2B, 2C, 2D, and/or 3.

At block 745, whether the activity score is less than the determined threshold may be determined. If not, the method may continue to block 750, where a counter may be reset. Thereafter, the method may return to block 730 to continue monitoring for activity of the application. The operation(s) at block 750 may be performed by the wireless communication management module 215/315, the wake lock management module 220/335, the wake lock determination module 235, the counter module 225, the counter controller 250, and/or the counter 255/340 described with reference to FIGS. 2A, 2B, 2C, 2D, and/or 3.

If the activity score is less than the determined threshold, the method may jump to block 755 at which the counter may be incremented. The operation(s) at block 755 may be performed by the wireless communication management module 215/315, the wake lock management module 220/335, the wake lock determination module 235, the counter module 225, the counter controller 250, and/or the counter 255/340 described with reference to FIGS. 2A, 2B, 2C, 2D, and/or 3.

Then at block 760, whether the current value of the counter (as incremented at block 755) is equal to the identified number of monitoring intervals (block 720) may be determined. Although not illustrated, a comparison operation may occur to enable this determination. If the counter value is not equal to the identified number of monitoring intervals, the method may return to block 730 to continue monitoring for activity of the application. The operation(s) at block 760 may be performed by the wireless communication management module 215/315, the wake lock management module 220/335, the wake lock determination module 235, the counter module 225, the counter controller 250, and/or the counter 255/340 described with reference to FIGS. 2A, 2B, 2C, 2D, and/or 3.

If the counter value is equal to the identified number of monitoring intervals, the method may continue to block 765 at which the wake lock may be released. As such, the determination of whether to release the wake lock may be based at least in part on whether the counter value equals the identified number of monitoring intervals. In this example, because the counter is reset only if the activity score for the application is not less than the threshold (e.g., the application is sufficiently active during the monitoring interval), and the monitoring of the activity of the application continues until the counter value equals the identified number of monitoring intervals (unless the method is otherwise terminated), the activity score is to be less than the identified threshold for the identified number of consecutive monitoring intervals for the wake lock to be released.

Thus, the method 700 may provide for managing wake locks in a wireless communication device. It should be noted that the method 700 is just one implementation and that the operations of the method 700 may be rearranged or otherwise modified such that other implementations are possible. Although not shown in FIG. 7, a suitable mechanism may be implemented to discontinue the method for a given application if the wake lock is released for any reason other than reaching block 765 of the method 700.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for managing wake locks in a wireless communication device, comprising:
   determining an activity threshold value for an activity of an application based at least in part on a class of the application;
   determining a monitoring interval of the application based at least in part on the class of the application;
   identifying a metric for each process and service associated with the class of the application;
   monitoring the activity of the application, for which a wake lock is held on the wireless communication device, during the monitoring interval that includes a number of consecutive monitoring intervals by comparing the metric for each process and service associated with the class of the application to the activity threshold value during each of the number of consecutive monitoring intervals;
   determining that the metric for each process and service associated with the class of the application is below the activity threshold value for a subset of consecutive intervals of the consecutive monitoring intervals;
   incrementing a counter value based at least in part on the metric for each process and service associated with the class of the application being below the activity threshold value;
   comparing the counter value to the determined monitoring interval;
   identifying that the counter value is equal to the subset of consecutive intervals of the consecutive monitoring intervals associated with the determined monitoring interval based at least in part on the comparing;
   determining whether to release the wake lock based at least in part on the monitored activity of the application during the subset of the consecutive intervals of the consecutive monitoring intervals and the counter value; and
   releasing the wake lock.

2. The method of claim 1, wherein the identifying the metric for each process and service associated with the activity of the application comprises: using at least one metric selected from the group consisting of: processor usage/load; process runtime; service runtime; number of processes; number of services; instances of kernel space wake locks held by services associated with the application; screen status; disk activity; network activity; memory usage/activity; and, sensor usage.

3. The method of claim 1, further comprising:
   identifying a plurality of metrics related to the activity of the application; and
   aggregating the identified plurality of metrics to obtain an activity score.

4. The method of claim 3, wherein the aggregating the plurality of metrics to obtain the activity score comprises:
   aggregating the identified plurality of metrics in a weighted linear combination.

5. The method of claim 3, further comprising:
   identifying a monitoring interval, a number of monitoring intervals with the activity score below the activity threshold value, the activity threshold value, or a combination thereof based at least in part on the application.

6. The method of claim 3, further comprising:
   comparing the obtained activity score to activity threshold value, wherein the determining whether to release the wake lock is based at least in part on a result of the comparing.

7. The method of claim 6, further comprising:
   identifying the activity threshold value based at least in part on the application.

8. The method of claim 6, further comprising:
   identifying a number of monitoring intervals with the activity score below the activity threshold value.

9. The method of claim 8, further comprising:
   releasing the wake lock when the activity score is below the activity threshold value for the identified number of monitoring intervals.

10. The method of claim 8, wherein the identifying the number of monitoring intervals is based at least in part on the application.

11. An apparatus for managing wake locks, comprising:
means for determining an activity threshold value for an activity of an application based at least in part on a class of the application;
means for determining a monitoring interval of the application based at least in part on the class of the application;
means for identifying a metric for each process and service associated with the class of the application;
means for monitoring the activity of the application, for which a wake lock is held on the wireless communication device, during the monitoring interval that includes a number of consecutive monitoring intervals by comparing the metric for each process and service associated with the class of the application to the activity threshold value during each of the number of consecutive monitoring intervals;
means for determining that the metric for each process and service associated with the class of the application is below the activity threshold value for a subset of consecutive intervals of the consecutive monitoring intervals;
means for incrementing a counter value based at least in part on the metric for each process and service associated with the class of the application being below the activity threshold value;
means for comparing the counter value to the determined monitoring interval;
means for identifying that the counter value is equal to the subset of consecutive intervals of the consecutive monitoring intervals associated with the determined monitoring interval based at least in part on the comparing;
means for determining whether to release the wake lock based at least in part on the monitored activity of the application during the subset of the consecutive intervals of the consecutive monitoring intervals and the counter value; and
means for releasing the wake lock.

12. The apparatus of claim 11, wherein the means for identifying the metric for each process and service associated with the activity of the application uses at least one metric selected from the group consisting of:
processor usage/load; process runtime; service runtime; number of processes; number of services; instances of kernel space wake locks held by services associated with the application; screen status; disk activity; network activity; memory usage/activity; and, sensor usage.

13. The apparatus of claim 11, further comprising:
means for identifying a plurality of metrics related to the activity of the application; and
means for aggregating the identified plurality of metrics to obtain an activity score.

14. The apparatus of claim 13, wherein the means for aggregating the plurality of metrics to obtain the activity score comprises:
means for aggregating the identified plurality of metrics in a weighted linear combination.

15. The apparatus of claim 13, further comprising:
means for comparing the obtained activity score to the activity threshold value, wherein the means for determining whether to release the wake lock is configured to use a result of the comparing for the determining.

16. The apparatus of claim 15, further comprising:
means for identifying a monitoring interval, a number of monitoring intervals with the activity score below the activity threshold value, the activity threshold value, or a combination thereof based at least in part on the application.

17. The apparatus of claim 15, further comprising:
means for identifying a number of monitoring intervals with the activity score below the activity threshold value; and
means for releasing the wake lock when the activity score is below the activity threshold value for the identified number of monitoring intervals.

18. A device for managing wake locks, comprising:
a processor;
memory in electronic communication with the processor; and
instructions stored in the memory, the instructions being executable by the processor to:
determine an activity threshold value for an activity of an application based at least in part on a class of the application;
determine a monitoring interval of the application based at least in part on the class of the application;
identify a metric for each process and service associated with the class of the application;
monitor the activity of the application, for which a wake lock is held on the wireless communication device, during the monitoring interval that includes a number of consecutive monitoring intervals by comparing the metric for each process and service associated with the class of the application to the activity threshold value during each of the number of consecutive monitoring intervals;
determine that the metric for each process and service associated with the class of the application is below the activity threshold value for a subset of consecutive intervals of the consecutive monitoring intervals;
increment a counter value based at least in part on the metric for each process and service associated with the class of the application being below the activity threshold value;
compare the counter value to the determined monitoring interval;
identify that the counter value is equal to the subset of consecutive intervals of the consecutive monitoring intervals associated with the determined monitoring interval based at least in part on the comparison;
determine whether to release the wake lock based at least in part on the monitored activity of the application during the subset of the consecutive intervals of the consecutive monitoring intervals and the counter value; and
release the wake lock.

19. The device of claim 18, wherein the instructions executable by the processor to identify the metric for each process and service associated with the activity of the application use at least one metric selected from the group consisting of:
processor usage/load; process runtime; service runtime; number of processes; number of services; instances of kernel space wake locks held by services associated with the application; screen status; disk activity; network activity; memory usage/activity; and, sensor usage.

20. The device of claim 18, wherein the instructions are executable by the processor to:
identify a plurality of metrics related to the activity of the application; and aggregate the identified plurality of metrics to obtain an activity score.

21. The device of claim 20, wherein the instructions executable by the processor to aggregate the identified plurality of metrics to obtain the activity score are executable by the processor to:
   aggregate the identified plurality of metrics in a weighted linear combination.

22. The device of claim 20, wherein the instructions are executable by the processor to:
   compare the obtained activity score to the activity threshold value, wherein the means for determining whether to release the wake lock is configured to use a result of the comparing for the determining.

23. The device of claim 22, wherein the instructions are executable by the processor to:
   identify a monitoring interval, a number of monitoring intervals with the activity score below the activity threshold value, the activity threshold value, or a combination thereof based at least in part on the application.

24. The device of claim 22, wherein the instructions are executable by the processor to:
   identify a number of monitoring intervals with the activity score below the activity threshold value; and
   release the wake lock when the activity score is below the activity threshold value for the identified number of monitoring intervals.

25. A non-transitory computer-readable medium storing instructions executable by a processor to:
   determine an activity threshold value for an activity of an application based at least in part on a class of the application;
   determine a monitoring interval of the application based at least in part on the class of the application;
   identify a metric for each process and service associated with the class of the application;
   monitor the activity of the application, for which a wake lock is held on the wireless communication device, during the monitoring interval that includes a number of consecutive monitoring intervals by comparing the metric for each process and service associated with the class of the application to the activity threshold value during each of the number of consecutive monitoring intervals;
   determine that the metric for each process and service associated with the class of the application is below the activity threshold value for a subset of consecutive intervals of the consecutive monitoring intervals;
   increment a counter value based at least in part on the metric for each process and service associated with the class of the application being below the activity threshold value;
   compare the counter value to the determined monitoring interval;
   identify that the counter value is equal to the subset of consecutive intervals of the consecutive monitoring intervals associated with the determined monitoring interval based at least in part on the comparison;
   determine whether to release the wake lock based at least in part on the monitored activity of the application during the subset of the consecutive intervals of the consecutive monitoring intervals and the counter value; and
   release the wake lock.

* * * * *